US012615647B2

(12) United States Patent
Yao et al.

(10) Patent No.: US 12,615,647 B2
(45) Date of Patent: Apr. 28, 2026

(54) FREQUENCY RESOURCE ALLOCATION FOR NEW RADIO MULTICAST OR BROADCAST SERVICES

(71) Applicant: APPLE INC., Cupertino, CA (US)

(72) Inventors: Chunhai Yao, Beijing (CN); Chunxuan Ye, Cupertino, CA (US); Dawei Zhang, Cupertino, CA (US); Fangli Xu, Beijing (CN); Haijing Hu, Cupertino, CA (US); Haitong Sun, Cupertino, CA (US); Hong He, Cupertino, CA (US); Wei Zeng, Cupertino, CA (US); Weidong Yang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 17/441,202

(22) PCT Filed: Jan. 13, 2021

(86) PCT No.: PCT/CN2021/071488
§ 371 (c)(1),
(2) Date: Sep. 20, 2021

(87) PCT Pub. No.: WO2022/151046
PCT Pub. Date: Jul. 21, 2022

(65) Prior Publication Data
US 2023/0097512 A1 Mar. 30, 2023

(51) Int. Cl.
*H04W 72/30* (2023.01)
*H04W 72/0457* (2023.01)
*H04W 72/1273* (2023.01)

(52) U.S. Cl.
CPC ....... *H04W 72/30* (2023.01); *H04W 72/0457* (2023.01); *H04W 72/1273* (2013.01)

(58) Field of Classification Search
None
See application file for complete search history.

(56) References Cited

U.S. PATENT DOCUMENTS

| | | | |
|---|---|---|---|
| 2019/0053318 A1 | 2/2019 | Nogami et al. | |
| 2020/0053757 A1 | 2/2020 | Bagheri et al. | |
| 2021/0050936 A1* | 2/2021 | Seo | H04L 5/0053 |
| 2021/0127359 A1* | 4/2021 | Takeda | H04L 5/0092 |
| 2021/0250958 A1* | 8/2021 | Liu | H04L 5/0053 |
| 2021/0329669 A1* | 10/2021 | Gao | H04W 72/53 |
| 2022/0046591 A1* | 2/2022 | Miao | H04W 72/30 |

(Continued)

FOREIGN PATENT DOCUMENTS

| | | |
|---|---|---|
| WO | 2020146848 | 7/2020 |

OTHER PUBLICATIONS

Li et al., U.S. Appl. No. 63/091,990, filed Oct. 15, 2020. (Year: 2020).*

(Continued)

*Primary Examiner* — Faruk Hamza
*Assistant Examiner* — Cassandra L Decker
(74) *Attorney, Agent, or Firm* — Kilpatrick Townsend & Stockton LLP

(57) ABSTRACT

The present application relates to devices and components including apparatus, systems, and methods for configuring and using multicast or broadcast services resource sets.

13 Claims, 15 Drawing Sheets

(56) References Cited

U.S. PATENT DOCUMENTS

| | | | | |
|---|---|---|---|---|
| 2022/0124766 | A1* | 4/2022 | Jung | H04W 72/044 |
| 2022/0210766 | A1* | 6/2022 | Liu | H04W 72/30 |
| 2023/0040690 | A1* | 2/2023 | Chen | H04L 5/0091 |
| 2023/0044962 | A1* | 2/2023 | Kim | H04W 76/40 |
| 2023/0189295 | A1* | 6/2023 | Baek | H04W 76/40 |
| | | | | 370/312 |
| 2023/0199739 | A1* | 6/2023 | Zhou | H04W 4/06 |
| | | | | 370/329 |
| 2023/0269758 | A1* | 8/2023 | Wu | H04W 72/23 |
| | | | | 370/312 |
| 2023/0379943 | A1* | 11/2023 | Wang | H04W 72/30 |
| 2023/0397299 | A1* | 12/2023 | Dai | H04W 4/06 |
| 2023/0403759 | A1* | 12/2023 | Li | H04W 72/30 |
| 2024/0089704 | A1* | 3/2024 | Shrivastava | H04W 72/0453 |

OTHER PUBLICATIONS

Support of Group Scheduling for RRC_CONNECTED UEs, 3GPP TSG RAN WG1 Meeting #102-e; R1-2006320, Aug. 28, 2020, 5 pages.

Support of Group Scheduling for RRC_CONNECTED UEs, 3GPP TSG RAN WG1 Meeting #103-e; R1-2008064, Nov. 13, 2020, 5 pages.

International Patent Application No. PCT/CN2021/071488, International Search Report and Written Opinion, Mailed on Sep. 29, 2021, 9 pages.

New Work Item on NR support of Multicast and Broadcast Services, Huawei, 3GPP TSG RAN Meeting #86, RP-193248, Dec. 9-12, 2019, 5 pages.

3rd Generation Partnership Project; Technical Specification Group Radio Access Network; NR; Multiplexing and channel coding (Release 16), 3GPP TS 38.212 V16.4.0, Dec. 2020, 152 pages.

3rd Generation Partnership Project; Technical Specification Group Radio Access Network; NR; Physical layer procedures for data (Release 16), 3GPP TS 38.214 V16.4.0, Dec. 2020, 169 pages.

3rd Generation Partnership Project; Technical Specification Group Radio Access Network; NR; Radio Resource Control (RRC) protocol specification (Release 16), 3GPP TS 38.331 V16.3.1, Jan. 2021, 932 pages.

International Patent Application No. PCT/CN2021/071488, International Preliminary Report on Patentability, Jul. 27, 2023, 6 pages.

3rd Generation Partnership Project; Technical Specification Group Radio Access Network; NR; Physical channels and modulation (Release 16), 3GPP TS 38.211 V16.4.0, Dec. 2020, 133 pages.

* cited by examiner

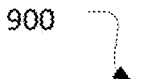

900

```
┌─────────────────────────┐
│  Receiving MBS configuration  │
│       information        │
│           904            │
└─────────────────────────┘
             │
             ▼
        ╱──────────╲                    ┌──────────────────────┐
       ╱  MBS BWP config?  ╲    Y       │  Applying MBS BWP for  │
      ╱        908          ╲ ·······▶  │  MBS multicast service │
       ╲                   ╱            │          912           │
        ╲──────────╱                    └──────────────────────┘
             │ N
             ▼
        ╱──────────╲                    ┌──────────────────────┐
       ╱    MBS     ╲       Y           │  Applying MBS initial  │
      ╱ initial BWP config? ╲ ·······▶  │  BWP for MBS multicast │
       ╲       916         ╱            │        service         │
        ╲──────────╱                    │          920           │
             │ N                        └──────────────────────┘
             ▼
        ╱──────────╲                    ┌──────────────────────┐
       ╱  Initial BWP config?  ╲   Y    │ Applying initial BWP for│
      ╱         924          ╲ ·······▶ │  MBS multicast service │
       ╲                   ╱            │          928           │
        ╲──────────╱                    └──────────────────────┘
             │ N
             ▼
┌─────────────────────────┐
│  Applying CORESET 0 for MBS  │
│           932            │
└─────────────────────────┘
```

Figure 9

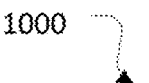
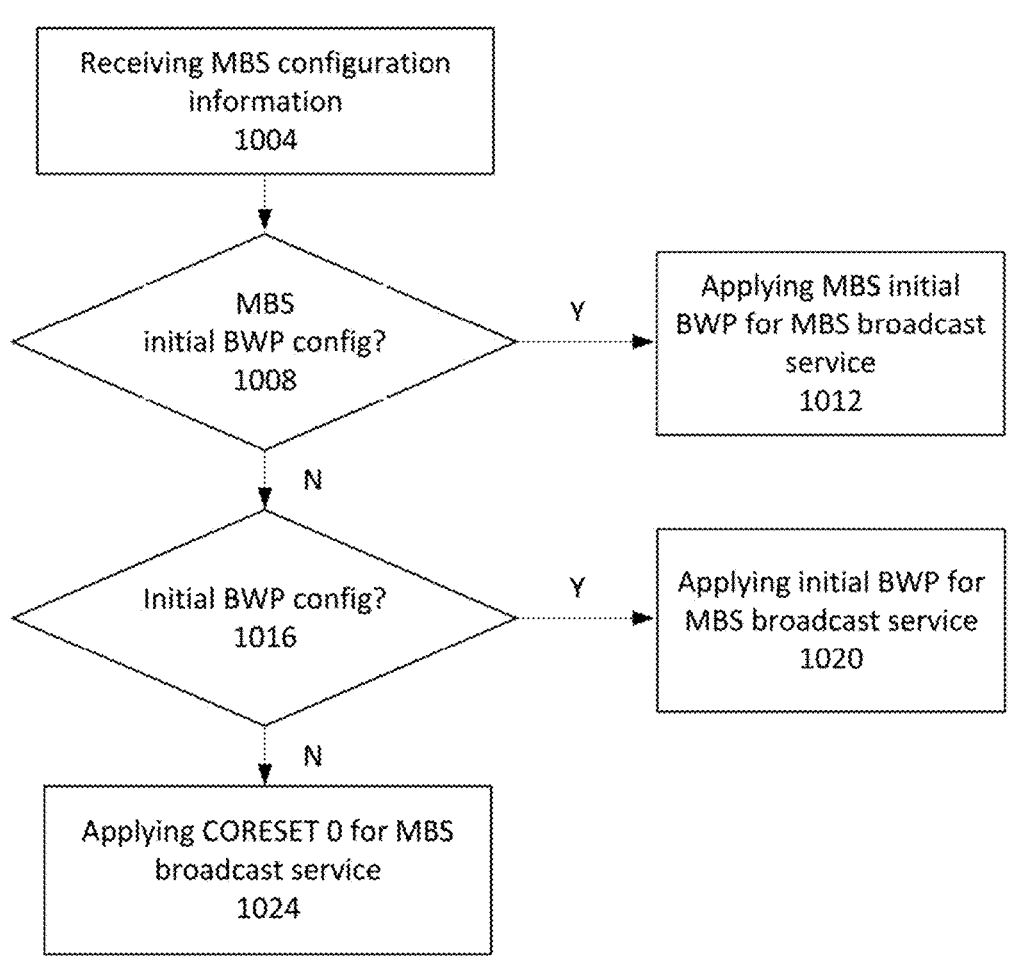
Figure 10

1100

Receiving SIB message to configure MBS resource set
1104

Receiving MBS PDCCH transmission
1108

Receiving MBS PDSCH transmission
1112

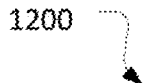
1200
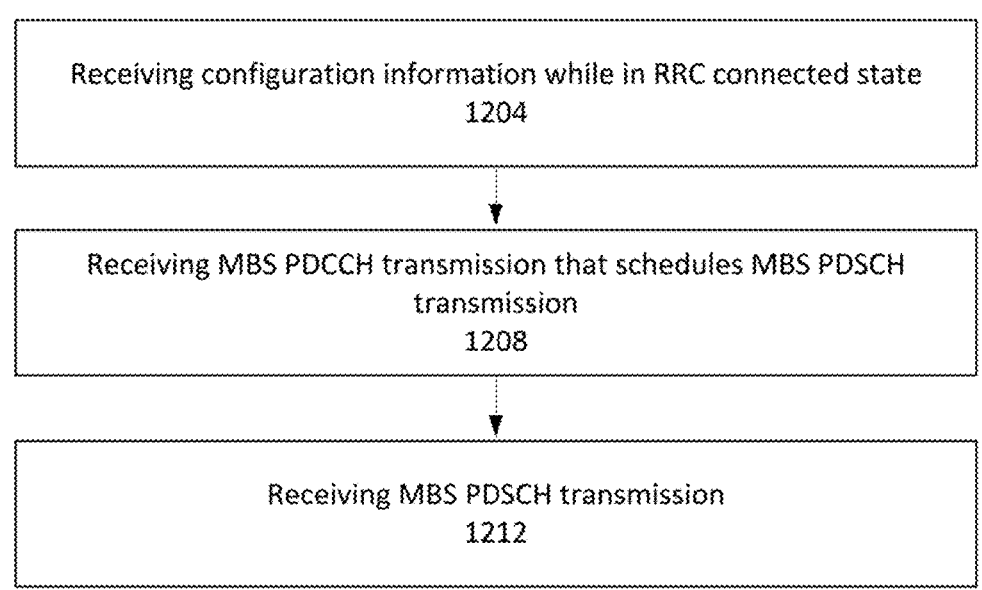
Receiving configuration information while in RRC connected state
1204
Receiving MBS PDCCH transmission that schedules MBS PDSCH transmission
1208
Receiving MBS PDSCH transmission
1212
Figure 12

1300

Configuring UEs with MBS resource set
1304

Transmitting MBS PDCCH to schedule MBS PDSCH
1308

Transmitting MBS PDSCH
1312

FREQUENCY RESOURCE ALLOCATION FOR NEW RADIO MULTICAST OR BROADCAST SERVICES

CROSS-REFERENCE TO RELATED APPLICATIONS

This application is a U.S. National Phase of International Application No. PCT/CN2021/071488, filed Jan. 13, 2021, the entire contents and disclosures of which is incorporated herein by reference.

BACKGROUND

Third Generation Partnership Project (3GPP) provides mechanisms for common downlink communications to be transmitted to more than two or more user equipments (UEs). These communications may be part of a multicast service, in which a selected group of UEs are able to receive the same data, or a broadcast service, in which all UEs are able to receive the same data. Further study on enhancing resource allocation to facilitate these multicast and broadcast communications is needed.

BRIEF DESCRIPTION OF THE DRAWINGS

FIG. 9 illustrates an operational flow/algorithmic structure in accordance with some aspects.

FIG. 10 illustrates another operational flow/algorithmic structure in accordance with some aspects.

FIG. 12 illustrates another operational flow/algorithmic structure in accordance with some aspects.

DETAILED DESCRIPTION

Figure 1:
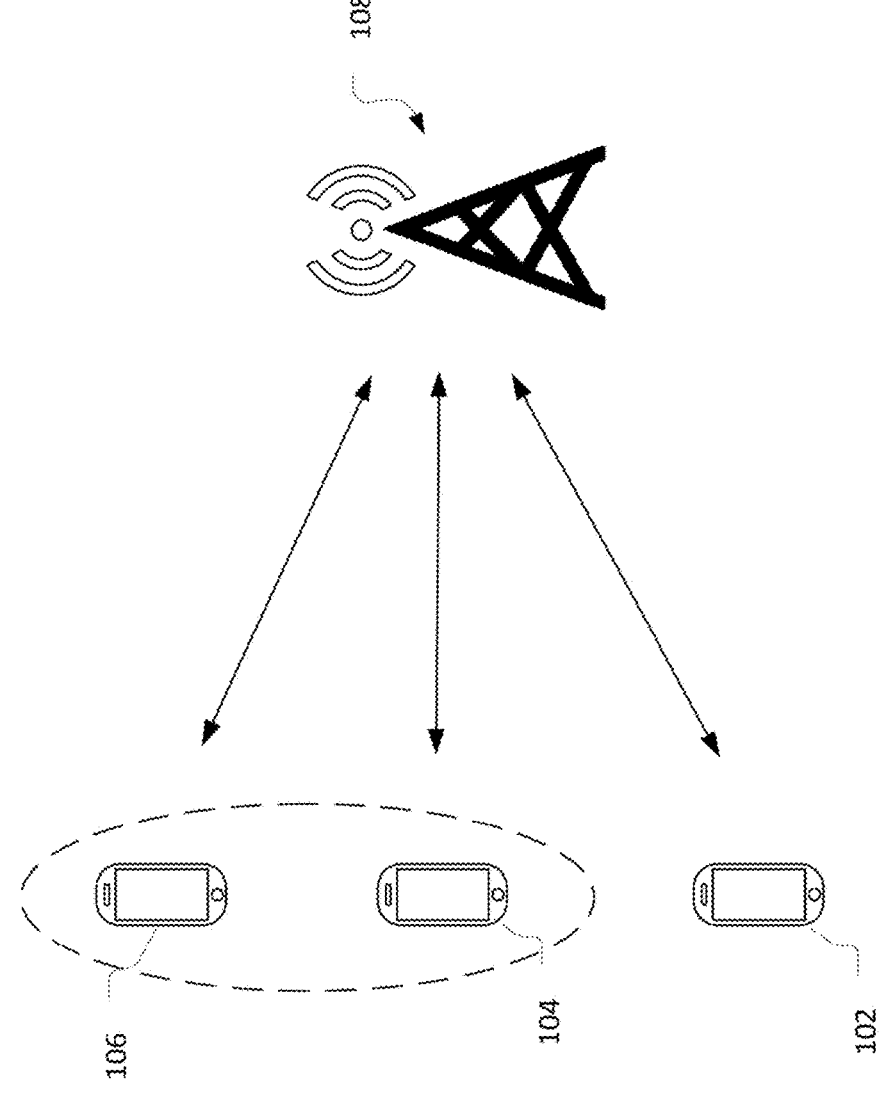
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some aspects. The network environment 100 may include UEs 102, 104, and 106, and a base station 108. The base station 108 may provide a wireless access cell through which one or more of the UEs 102/104/106 may communicate with the base station 108. In some aspects, the base station 108 is a gNB that provides 3GPP New Radio (NR) cell. The air interfaces over which the UEs 102/104/106 and base station 108 communicate may be compatible with 3GPP technical specifications (TSs) such as those that define Fifth Generation (5G) NR system standards.

In 5G networks, the downlink carrier may be divided into a number of bandwidth parts (BWPs). This may facilitate the efficient provision of services in an environment in which different devices have different channel bandwidth capabilities. The BWP may include a set of contiguous common resource blocks. The resource blocks within a particular BWP may be referred to as physical resource blocks (PRBs) and may start with PRB 0. A common resource block number ($n_{CRB}$) may be mapped to a PRB number ($n_{CRB}$) by:

$$n_{CRB} = n_{PRB} + N_{BWP,i}^{start},$$

where $$N_{BWP,i}^{start}$$

is the common resource block where the BWP starts.

The base station 108 may use a physical downlink control channel (PDCCH) to transmit downlink control information (DCI) to the UEs 102/104/106. The DCI may provide uplink resource allocations on a physical uplink shared channel (PUSCH), downlink resource allocations on a physical downlink shared channel (PDSCH), and various other control information.

The PDCCH may be configured by a control resource set (CORESET) that defines a set of resource blocks and number of symbols for the control channel. A search space associated with the CORESET may configure the time of the control channel, for example, periodicity, offset, etc. One downlink BWP may be configured with up to three CORESETs.

A CORESET having an identity zero (CORESET 0) may be configured by a controlResourceSetZero information element within a master information block (MIB) and within a ServingCellConfigCommon parameter structure. CORESET 0 may be associated with an initial downlink BWP.

The initial downlink BWP may be configured by an initialDownlinkBWP parameter transmitted in system information block 1 (SIB 1). The UEs 102/104/106 may use the initial downlink BWP when first accessing a cell provided by the base station 108. The base station 108 may configure up to four additional downlink BWPs per cell.

The PDSCH may be used to transfer application data, signaling radio bearer (SRB) messages, system information and paging messages. Providing reliable PDSCH reception is an objective of a network system design. This may be especially the case for providing services such as ultra-reliable and low-latency communication (URLLC) service, which is a target use case of NR networks.

The UEs 102/104/106 may include radio resource control (RRC) state machines that perform operations related to a variety of RRC procedures including, for example, paging, RRC connection establishment, RRC connection reconfiguration, and RRC connection release. The RRC state machine may be implemented by protocol processing circuitry, see, for example, baseband circuitry 1404A of FIG. 14.

The RRC state machine may transition a UE into one of a number of RRC states (or "modes") including, for example, a connected state (RRC connected), an inactive state (RRC inactive), and an idle state (RRC idle). A UE may start in RRC idle when it first camps on a 5G cell, which may be after the UE is switched on or after an inter-system cell reselection from a Long Term Evolution (LTE) cell. To engage in active communications, the RRC state machine may transition the UE from RRC idle to RRC connected by performing an RRC setup procedure to establish a logical connection, for example, an RRC connection, with the base station 108. In RRC connected, the UE may be configured with at least one SRB for signaling (for example, control messages) with the base station; and one or more data radio bearers (DRBs) for data transmission. When the UE is less actively engaged in network communications, the RRC state machine may transition the UE from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

The PDSCH may be used to transmit data with respect to multicast or broadcast services (MBS). For example, the base station 108 may transmit broadcast information in a PDSCH that may be received by any of the UEs 102/104/106. For another example, the base station 108 may transmit multicast information in a PDSCH that is directed to a specific group of UEs, for example, UEs 104 and 106.

In order to provide NR support for MBS, group scheduling aspects may be needed to allow UEs to receive unicast PDSCH transmissions simultaneously with MBS transmissions. Furthermore, basic radio access network (RAN) functions may be considered to allow the UE to receive MBS transmissions in RRC idle or RRC inactive states. Future releases of 3GPP TSs may define and configure common frequency resources for group-common PDSCH transmissions for UEs in RRC connected state. Further considerations may include whether to reuse a BWP framework; whether more than one common frequency resource can be configured per UE; and the relation between the common frequency resource and UE-dedicated BWP, for example, whether the common frequency resource is an MBS-specific BWP, whether the common frequency resource is confined within UE's dedicated BWP, etc.

It may be desired, from a physical layer perspective, for broadcast reception, that a same group-common PDCCH and the corresponding scheduled group-common PDSCH can be received by UEs in both RRC idle/inactive and connected states. Further, for UEs in RRC idle/inactive, common frequency resource(s) for group-common PDCCH/PDSCH may be defined and configured. The UE may assume an initial BWP as a default common frequency resource for group-common PDCCH/PDSCH, if a specific common frequency resource is not configured. Aspects that may be further considered and described herein may include: the relation of the common frequency resource(s), if configured, and the initial BWP; whether to configure one or more common frequency resources; and configuration and definition details of a common frequency resource.

Various aspects of the present disclosure describe how to allocate common resources for MBS for UEs in an RRC-connected state; how to allocate common resources for MBS for UEs in RRC idle or RRC inactive states; and the interworking between MSB resources and the UE-active BWP.

The base station 108 may configure an initial downlink BWP by broadcasting system information in a system information block (SIB) 1 transmission. According to current specifications, the initial downlink BWP may only be applied after a UE is in an RRC connected state. Before the UE is in the RRC connected state, the CORESET 0 is applied for downlink reception.

Furthermore, before a physical random access channel (PRACH) process is finished, for example, before the UE receives message four (msg4) of the PRACH process, the CORESET 0 is applied. For example, as described in section 7.3.1.2.1 of 3GPP TS 38.212 v16.4.0 (2020-12), a UE may apply CORESET 0 to determine a downlink PRB number. With respect to message 2 of the PRACH, which is sent using random-access (RA)-radio network temporary identity (RNTI), 3GPP TS 38.212 describes "[t]he following information is transmitted by means of the DCI format 1_0 with CRC scrambled by RA-RNTI or MsgB-RNTI:—Frequency domain resource assignment $$-\left\lceil \log_2\left(N_{RB}^{DL,BWP}\left(N_{RB}^{DL,BWP}+1\right)/2\right)\right\rceil$$

bits [where]

$$N_{RB}^{DL,BWP}$$

is the size of CORESET 0 if CORESET 0 is configured for the cell." And, for msg4 of the PRACH process, which is sent using temporary cell RNTI (TC-RNTI), 3GPP TS 38.212 describes "[t]he following information is transmitted by means of the DCI format 1_0 with CRC scrambled by TC-RNTI: . . . Frequency domain resource assignment $$-\left\lceil \log_2\left(N_{RB}^{DL,BWP}\left(N_{RB}^{DL,BWP}+1\right)/2\right)\right\rceil$$

bits [where]

$$N_{RB}^{DL,BWP}$$

is the size of CORESET 0."

Thus, if MBS broadcast service supported is to be provided to UEs in RRC idle or inactive states, it would be restricted to transmit CORESET 0 given restrictions in current specifications.

Aspects of the present disclosure describe allocating common frequency resources for MBS service by configuring and defining an MBS resource set. As used herein, an MBS resource set may be an MBS dedicated BWP or an MBS frequency region in a UE-dedicated BWP. Further aspects provide updates to technical specifications that will facilitate reception of MBS transmissions by UEs, whether they are in RRC connected, idle, or inactive states.

Figure 2:
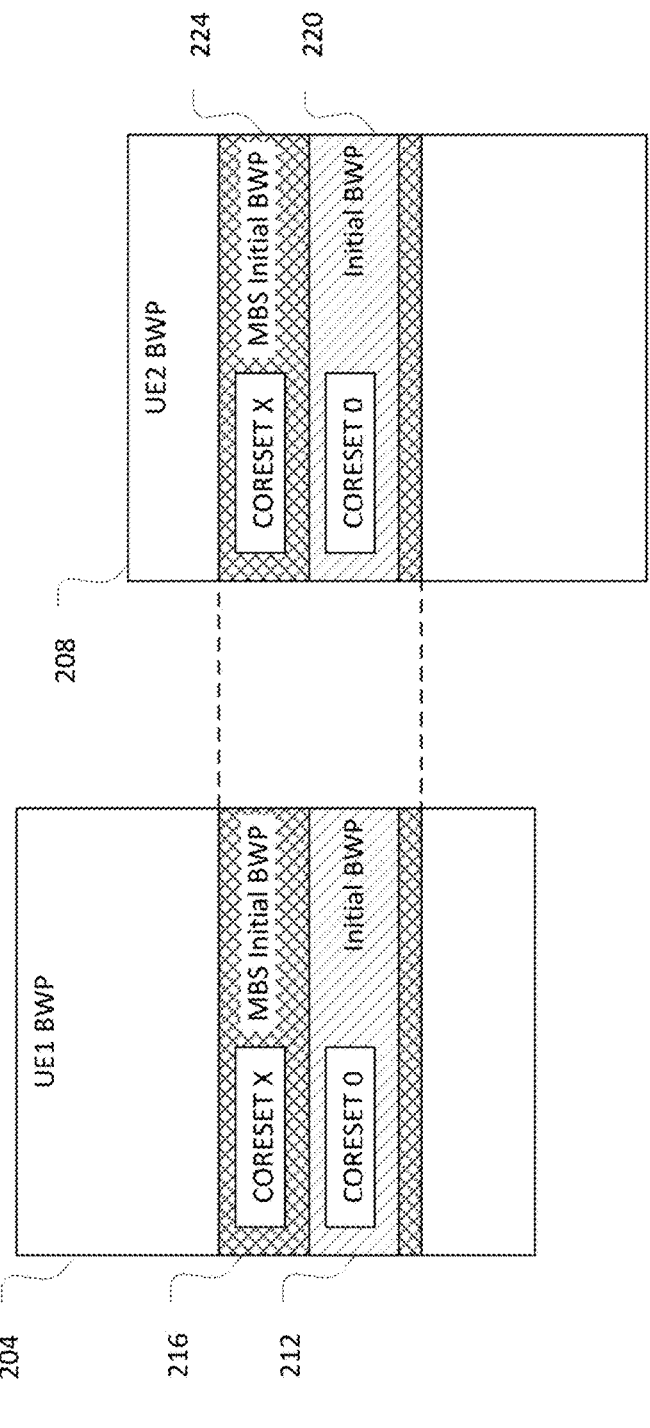
FIG. 2 illustrates a resource allocation in accordance with some aspects.

FIG. 2 illustrates a resource allocation 200 in accordance with some aspects. The resource allocation 200 includes a UE1 BWP 204 and a UE2 BWP 208. The UE1 BWP 204 may be a UE-dedicated BWP configured for a first UE, while UE2 BWP 208 may be a UE-dedicated BWP configured for a second UE. As shown, the UE-dedicated BWPs may overlap, but do not necessarily align in frequency.

The UE1 BWP 204 may include an initial BWP 212 having CORESET 0, and MBS initial BWP 216 having CORESET X. X, as used herein, may be a number other than zero. Similarly, the UE2 BWP 208 may include an initial BWP 220 having CORESET 0, and MBS initial BWP 224 having CORESET X. The initial BWPs 212 and 220 may align in frequency, as do the MBS initial BWPs 216 and 224. The MBS initial BWPs 216 and 224 may contain CORESET 0 and the initial BWPs 212 and 220 within their respective frequency domains.

The MBS initial BWPs 216 and 224 may be common frequency resources configured by broadcast system information, for example, SIBz, where z is one or larger. For example, the base station 108 may use SIB1, SIB2, etc. to configure the MBS initial BWPs 216 and 224.

In some embodiments, the configuration of the MBS initial BWPs may include generic parameters such as, for example, locationAndBandwidth to indicate a frequency domain and bandwidth for the BWP; subcarrierSpacing to indicate a subcarrier spacing to be used for channels and reference signals within the BWP; cyclicPrefix to indicate whether to use and extended cyclic prefix for the BWP; pdcch-ConfigCommon to indicate cell-specific parameters for a PDCCH of the BWP; and pdsch-ConfigCommon to indicate cell-specific parameters for a PDSCH of the BWP.

After configuration, the MBS initial BWPs 216 and 224 may be valid BWPs that the UEs may apply for MBS broadcast service. For example, a UE in an idle or inactive state does not need to switch into a connected state before receiving broadcast transmissions on the MBS initial BWPs 216 and 224. A UE may decode MBS PDCCH/PDSCH in the MBS initial BWP.

In some instances, the MBS PDCCH may be transmitted based on CORESET X and may schedule an MBS PDSCH in a corresponding MBS initial BWP. In the event that CORESET X is not configured, CORESET 0 may be used to schedule the MBS PDSCH within the MBS initial BWP.

While the MBS initial BWPs 216 and 224 are each shown with one CORESET (CORESET X), it may be possible to configure each of these BWPs with up to three CORESETs.

Figure 3:
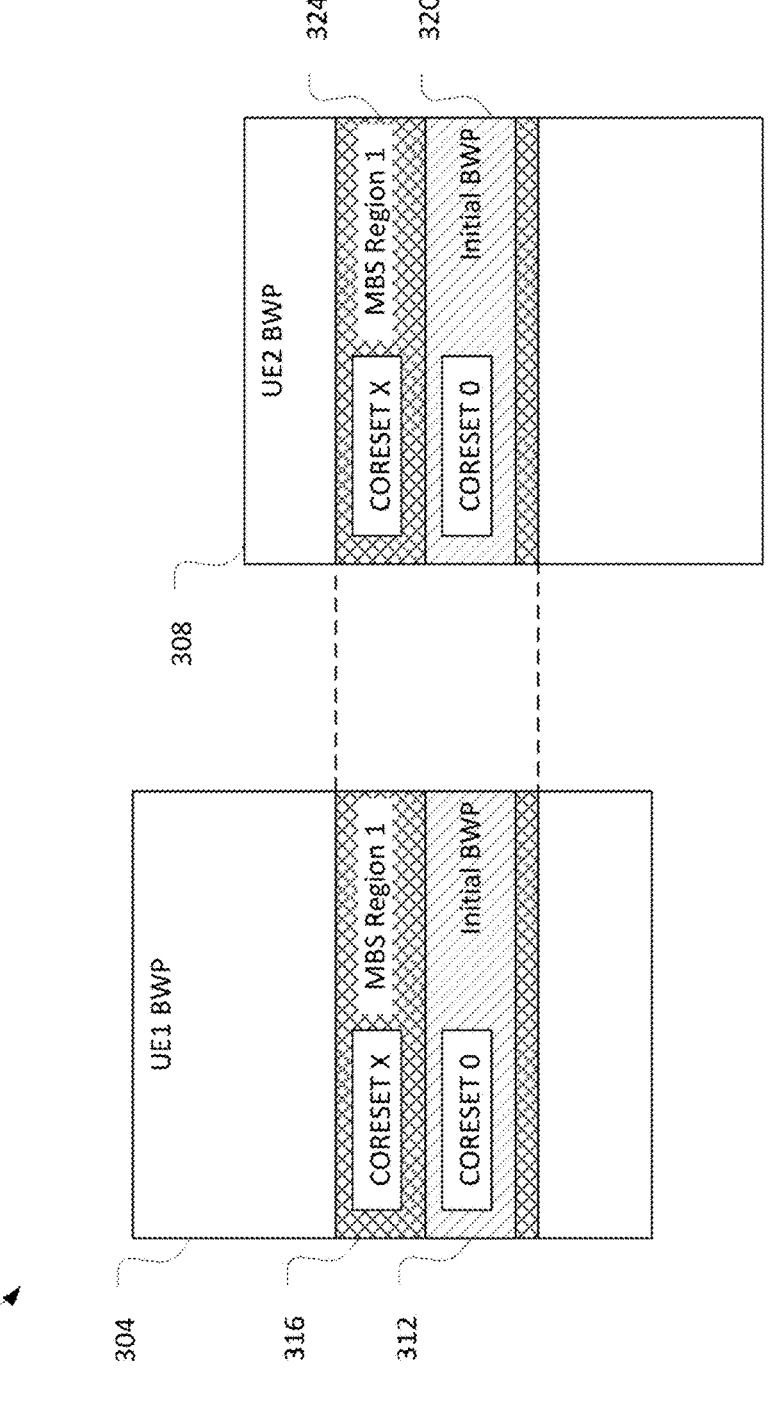
FIG. 3 illustrates another resource allocation in accordance with some aspects.

FIG. 3 illustrates a resource allocation 300 in accordance with some aspects. The resource allocation 300 includes a UE1 BWP 304 and a UE2 BWP 308. The UE1 BWP 304 may be a UE-dedicated BWP configured for a first UE, while UE2 BWP 308 may be a UE-dedicated BWP configured for a second UE. As shown, the UE-dedicated BWPs may overlap, but do not necessarily align in frequency.

The UE1 BWP 304 may include an initial BWP 312 having CORESET 0, and MBS region 1 316 having CORESET X. X, as used herein, may be a number other than zero. Similarly, the UE2 BWP 308 may include an initial BWP 320 having CORESET 0, and MBS region 2 324 having CORESET X. The initial BWPs 312 and 320 may align in frequency, as do MBS region 1 316 and MBS region 2 324. MBS region 1 316 may contain CORESET 0 and initial BWP 312 within its frequency domain, and MBS region 1 324 may contain CORESET 0 and initial BWP 320 within its frequency domain.

Similar to description above with respect to FIG. 2, the MBS frequency regions may be configured by SIBz and may, thereafter, be used to receive MBS broadcast service. For example, UEs in idle or inactive states do not need to switch into a connected state before receiving broadcast transmissions on MBS region 1 316 or MBS region 2 324. A UE may decode MBS PDCCH/PDSCH in the MBS region 1.

Providing the MBS region is within the respective UE-dedicated BWPs may facilitate a UE (in RRC connected state) transitioning from receiving MBS services in MBS regions to receiving unicast PDSCH transmissions without having to perform a BWP switch.

In some instances, the MBS PDCCH may be transmitted based on CORESET X and may schedule an MBS PDSCH in a corresponding MBS region. In the event that CORESET X is not configured, CORESET 0 may be used to schedule the MBS PDSCH within the MBS region.

The CORESET configuration of resource allocation 300 may be more limited than the CORESET configuration of resource allocation 200. For example, the UE1 BWP 304 may be limited to three CORESETS. Thus, the configuration of CORESETs for MBS and for unicast PDSCH may be limited by this constraint. In resource allocation 200, however, MBS-dedicated BWPs are configured separately from the UE-specific BWPs. Therefore, the unicast PDSCH reception may not be impacted by the MBS and the CORESET configurations may not present a bottleneck. For example, the base station 108 may configure up to three CORESETs for each of the MBS initial BWPs.

With respect to either resource allocation 200 or 300 (or later described resource allocations), a UE may receive an MBS broadcast transmission in an MBS resource set directly after acquisition of the related MBS configuration information. This may be the case whether the UE is in RRC idle state, RRC inactive state, or RRC connected state. In the event the UE is in the RRC idle or inactive states, the UE can receive the broadcast service directly from the MBS resource set without having to switch into an RRC connected mode. In this event, the MBS resource set may be configured independently from UE dedicated BWP configurations, which may be configured after the UE is in the RRC connected mode.

The common frequency resources configured as the MBS resource set, may be shared by different MBS multicast services and a unicast PDSCH. The resources may be shared by multiplexing the different services in a frequency domain, with different PRB allocations for different MBS services or unicast PDSCH. For example, a first set of PRBs may be used for a first MBS service, a second set of PRBs may be used for a second MBS service, and a third set of PRBs may be used for a unicast PDSCH. The sets may be non-overlapping sets of PRBs.

Additionally/alternatively, resources of an MBS resource set may be shared by different MBS multicast services and a unicast PDSCH being multiplexed in a time domain. For example, a first set of slots may be used for a first MBS service, a second set of slots may be used for a second MBS service, and a third set of slots may be used for a unicast PDSCH. The sets may be non-overlapping sets of slots.

Figure 4:
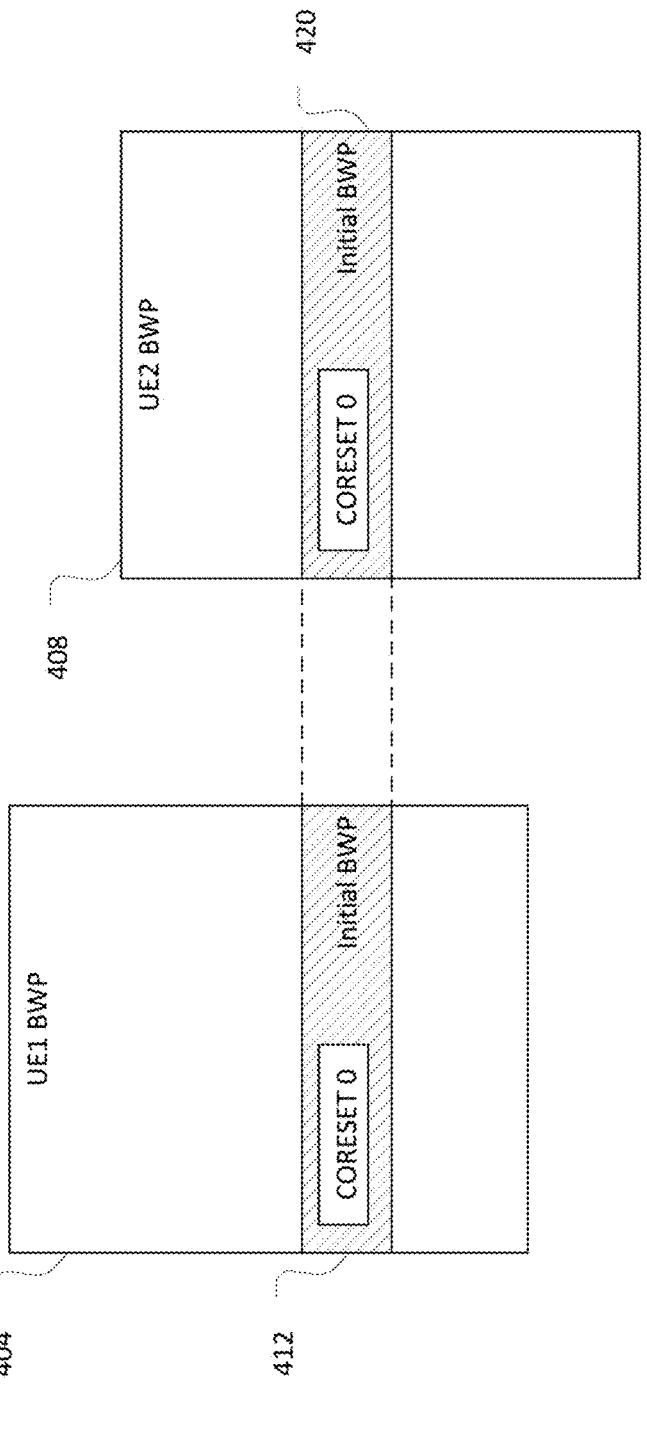
FIG. 4 illustrates another resource allocation in accordance with some aspects.

FIG. 4 illustrates a resource allocation 400 in accordance with some aspects.

The resource allocation 400 includes a UE1 BWP 404 and a UE2 BWP 408. The UE1 BWP 404 may be a UE-dedicated BWP configured for a first UE, while UE2 BWP 408 may be a UE-dedicated BWP configured for a second UE. As shown, the UE-dedicated BWPs may overlap, but do not necessarily align in frequency.

The UE1 BWP 404 may include an initial BWP 412 having CORESET 0. Similarly, the UE2 BWP 408 may include an initial BWP 420 having CORESET 0. In contrast to resource allocations 200 and 300, no MBS-specific resources are configured in resource allocation 400. Rather, MBS service may be configured on the initial downlink BWPs, for example, initial BWPs 412 and 420. Thus, in this case, the initial downlink BWPs may be the MBS resource sets. The initial BWPs 412 and 420 may be configured to provide MBS service through, for example, an Initialdown-linkBWP parameter structure transmitted in a SIBz.

In some situations, the initial BWPs 412 and 420 may be enabled after an MBS-capable UE decodes the SIBz to acquire the information for the MBS service. Enabling use of the initial BWPs 412 and 420 after acquiring the MBS service information may allow a UE in RRC idle or inactive to receive broadcast services without switching to an RRC connected state.

In some instances, the initial BWPs 412 and 420 may be shared between MBS services and unicast PDSCH transmissions.

An MBS capable UE may use CORESET 0 for receiving MBS PDCCH transmissions. The MBS PDCCH transmission may schedule the MBS PDSCH in the initial BWP. In the event that an initial BWP is not configured, the CORESET 0 may be applied for both the MBS PDCCH and the MBS PDSCH.

In some embodiments, the resource allocation 400 may be used as a fallback solution for resource allocation 300. For example, if the MBS initial BWP is not configured for MBS broadcast service, then a UE may use the initial BWP for MBS broadcast service.

Figure 5:
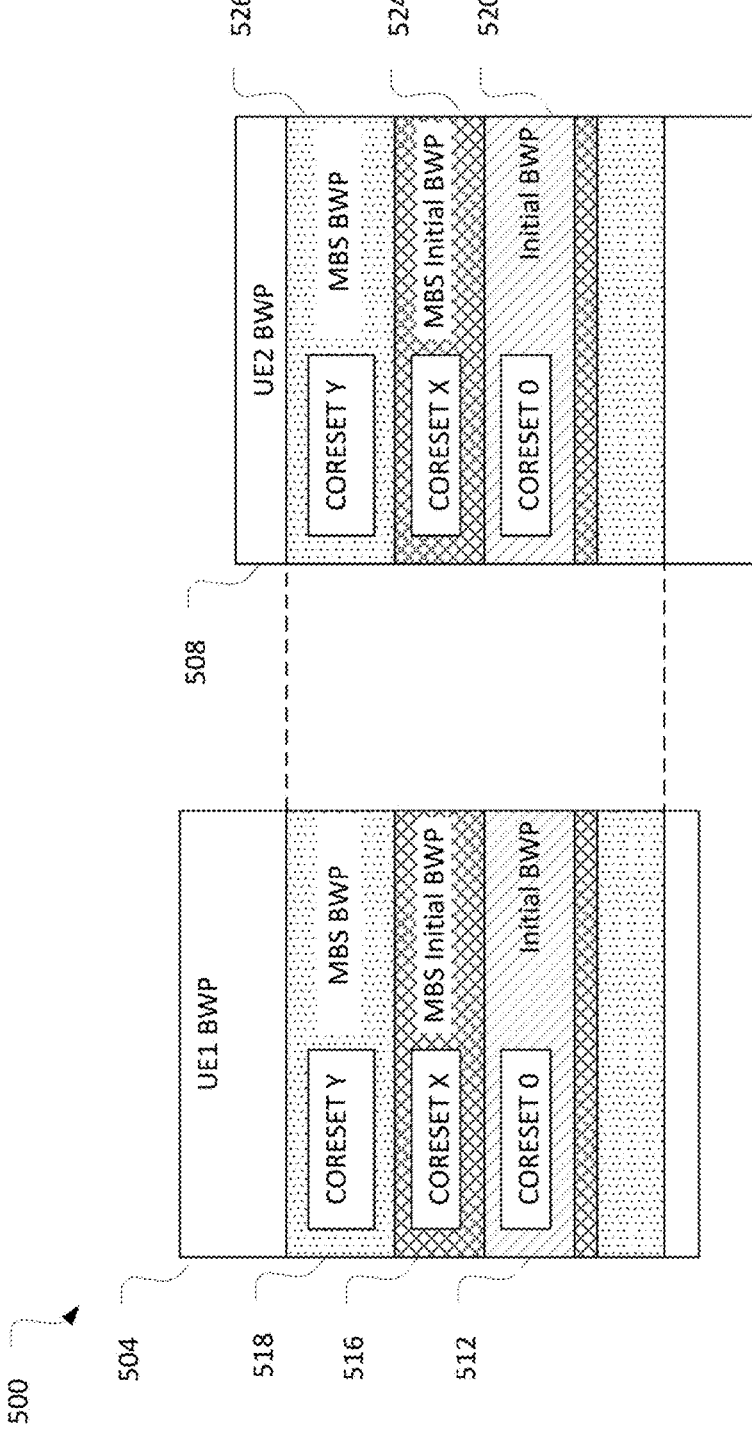
FIG. 5 illustrates another resource allocation in accordance with some aspects.

FIG. 5 illustrates a resource allocation 500 in accordance with some aspects. The resource allocation 500 includes a UE1 BWP 504 and a UE2 BWP 508. The UE1 BWP 504 may be a UE-dedicated BWP configured for a first UE, while UE2 BWP 508 may be a UE-dedicated BWP configured for a second UE. As shown, the UE-dedicated BWPs may overlap, but do not necessarily align in frequency.

The UE1 BWP 504 may include an initial BWP 512 having CORESET 0; an MBS initial BWP 516 having CORESET X; and MBS BWP 518 having CORESET Y, Y may be any number other than 0 and X. Similarly, the UE2 BWP 508 may include an initial BWP 520 having CORESET 0; MBS initial BWP 524 having CORESET X; and MBS BWP having CORESET Y. MBS BWP 518 may align with MBS BWP 526, MBS initial BWP 516 may align with MBS initial BWP 524; and initial BWP 512 may align with initial BWP 520.

The MBS BWPs 518 and 526 may be configured for a group of UEs to enable MBS multicast transmissions to the group of UEs. The MBS BWPs 518 and 526 may be configured by UE-dedicated (or UE-group dedicated) control signaling such as, for example, RRC signaling. Thus, the MBS multicast transmissions may serve UEs that are in the RRC connected state.

In some instances, the MBS BWPs 518 and 526 may be primarily used for MBS multicast services to RRC connected UEs, while MBS initial BWPs 516 and 524 may be used for MBS broadcast services to RRC connected/idle/inactive UEs or for MBS multicast services for RRC connected UEs.

In general, for MBS PDSCH scheduling, if MBS BWP is configured, the MBS multicast service may be scheduled on the MBS BWP. If MBS BWP is not configured, the UE may check to determine whether an MBS initial BWP is configured. If the initial MBS BWP is configured, the MBS multicast service may be scheduled on the MBS initial BWP. If the MBS initial BWP is not scheduled, the UE may check to determine whether an initial BWP is configured. If the initial BWP is configured, the MBS multicast service may be scheduled on the initial BWP. If the initial BWP is not configured, the CORESET 0 may be applied to receive the MBS multicast services.

The CORESET used for MBS PDCCH, which schedules the MBS PDSCH, may be determined as follows. If CORESET Y is configured in the MBS BWP, it may be used for transmitting the MBS PDCCH. If CORESET Y is not configured, the UE may determine whether CORESET X is configured. If CORESET X is configured in the MBS initial BWP, it may be used for transmitting the MBS PDCCH. If CORESET X is not configured, CORESET 0 may be used for transmitting the MBS PDCCH.

Each MBS service, indicated by a particular MBS identifier (ID), may be assigned a specific RNTI, for example, an MBS ID-RNTI. An MBS-enabled UE may monitor the PDCCH CORESET to decode a PDCCH having its cyclic redundancy check (CRC) scrambled by the MBS_ID-RNTI.

Configuring the MBS BWPs (or MBS resource sets, in general) within the UE-dedicated BWPs, as shown in FIG. 5, for example, may avoid a UE having to switch between MBS BWP and UE dedicated BWP to receive MBS services and unicast PDSCH, respectively.

Figure 6:
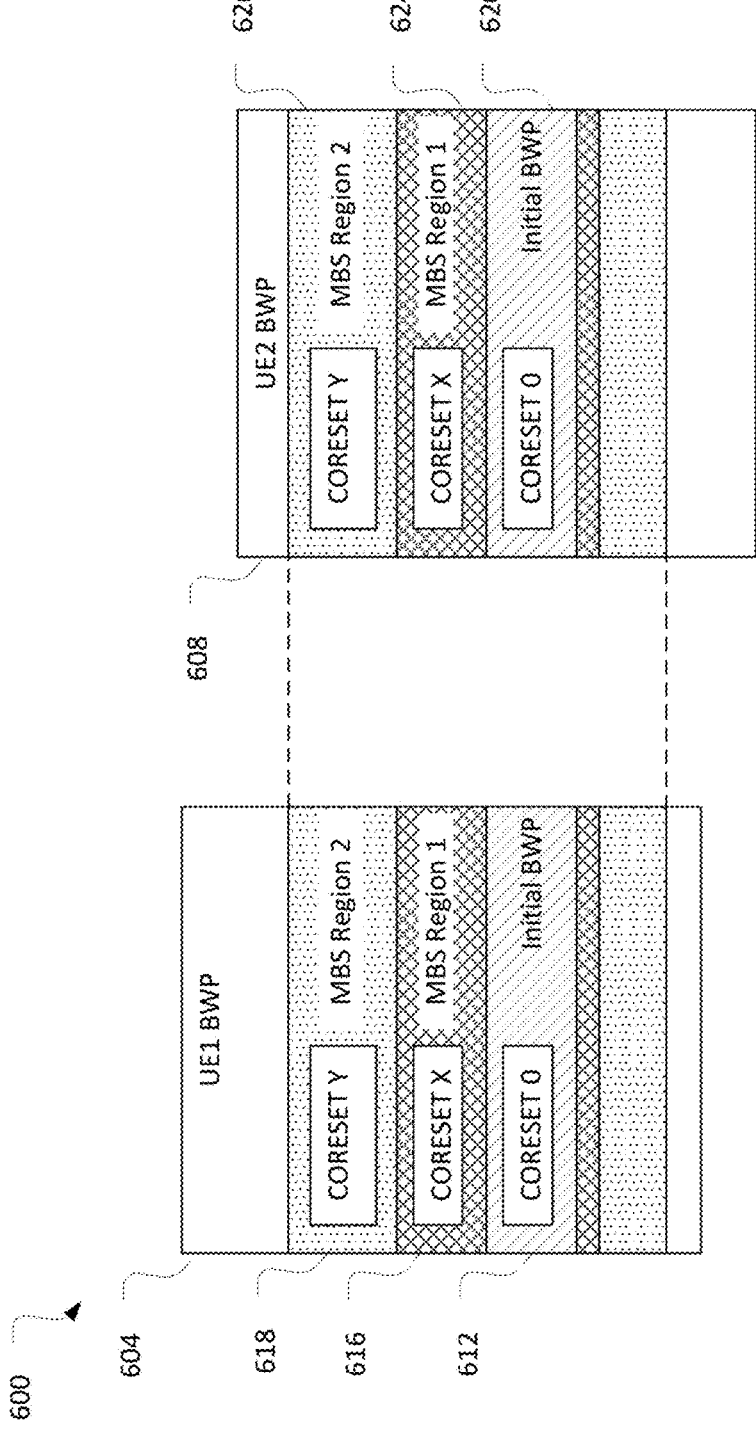
FIG. 6 illustrates another resource allocation in accordance with some aspects.

FIG. 6 illustrates a resource allocation 600 in accordance with some aspects. The resource allocation 600 includes a UE1 BWP 604 and a UE2 BWP 608. The UE1 BWP 604 may be a UE-dedicated BWP configured for a first UE, while UE2 BWP 608 may be a UE-dedicated BWP configured for a second UE. As shown, the UE-dedicated BWPs may overlap, but do not necessarily align in frequency.

The UE1 BWP 604 may include an initial BWP 612 having CORESET 0; an MBS region 1 616 having CORESET X; and MBS region 2 618 having CORESET Y. Similarly, the UE2 BWP 608 may include an initial BWP 620 having CORESET 0; MBS region 1 624 having CORESET X; and MBS region 2 626 having CORESET Y.

In general, for MBS PDSCH scheduling, if MBS region 2 is configured, the MBS multicast service may be scheduled on the MBS region 2. If MBS region 2 is not configured, the UE may check to determine whether an MBS region 1 is configured. If the MBS region 1 is configured, the MBS multicast service may be scheduled on the MBS region 1. If the MBS region 1 is not scheduled, the UE may check to determine whether an initial BWP is configured. If the initial BWP is configured, the MBS multicast service may be scheduled on the initial BWP. If the initial BWP is not configured, the CORESET 0 may be applied to receive the MBS multicast services.

The CORESET used for MBS PDCCH, which schedules the MBS PDSCH, may be determined as follows. If CORESET Y is configured in the MBS region 2, it may be used for transmitting the MBS PDCCH. If CORESET Y is not configured, the UE may determine whether CORESET X is configured. If CORESET X is configured for MBS region 1, it may be used for transmitting the MBS PDCCH. If CORESET X is not configured, CORESET 0 may be used for transmitting the MBS PDCCH.

One difference between configuration of MBS BWPs and frequency regions is that once MBS BWPs are configured, then PDCCH and PDSCH resources may be configured on the MBS BWPs. For example, the PDCCH may be configured with up to three CORESETs and up to ten search spaces; and the PDSCH may include a time domain resource allocation (TDRA) list with parameters such as k0, mapping type, and startSymbolAndLength updated for MBS service. MBS regions, on the other hand, may be restricted to existing PDCCH/PDSCH configurations, for example, those associated with a BWP in which the MBS region is configured.

Figure 7:
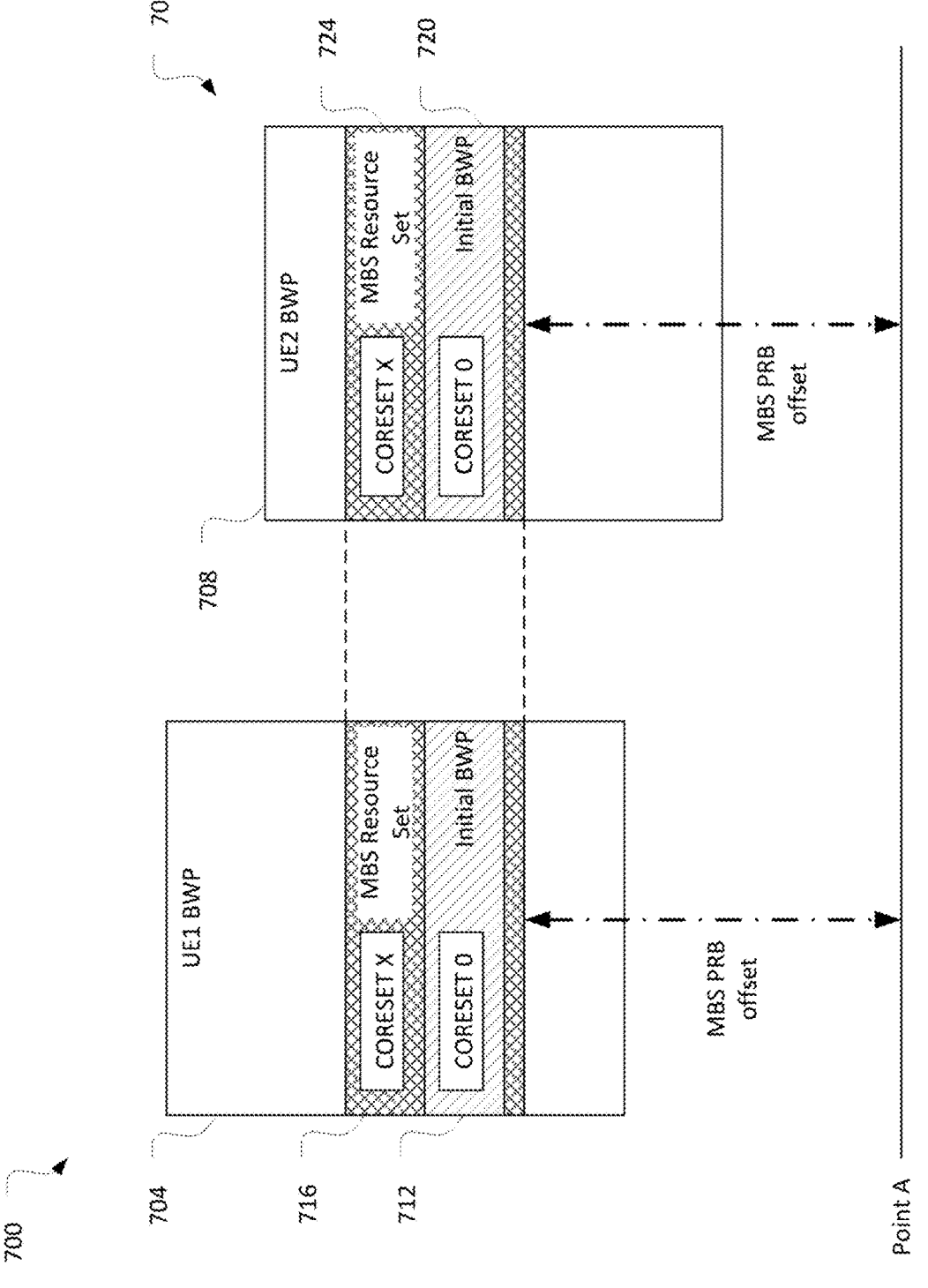
FIG. 7 illustrates another resource allocation in accordance with some aspects.

FIG. 7 illustrates configuration of the resource allocation 700 in accordance with some embodiments. The resource allocation 700 may include UE-dedicated BWPs such as, for example, UE1 BWP 704 and a UE2 BWP 708.

The UE1 BWP 704 may include an initial BWP 712 configured with CORESET 0 and an MBS resource set 716 configured with CORESET X. Similarly, the UE2 BWP 708 may include an initial BWP 720 configured with CORESET 0 and an MBS resource set 724 configured with CORESET X. The MBS resource sets 716 and 724 may be similar to MBS initial BWP, MBS BWP, MBS region 1, or MBS region 2 as described elsewhere herein.

The base station 108 may configure UEs with an indication of a starting PRB of the MBS resources and a number of PRBs in the MBS resources. For example, the starting PRB may be indicated by providing an MBS PRB offset that is with reference to a Point A, which may correspond to center of subcarrier 0 belonging to common resource block 0. Point A may be signaled within a SIB. The indication may be a resource indication value (RIV) that corresponds to both the MBS PRB offset and the number of PRBs in the MBS resource.

The indications of the starting PRB and number of PRBs may be transmitted in cell-specific or UE-group specific signaling, for example, RRC signaling. Because the MBS PRB offset is defined relative to Point A, it may be the same for all UEs configured with the MBS resource sets.

Figure 8:
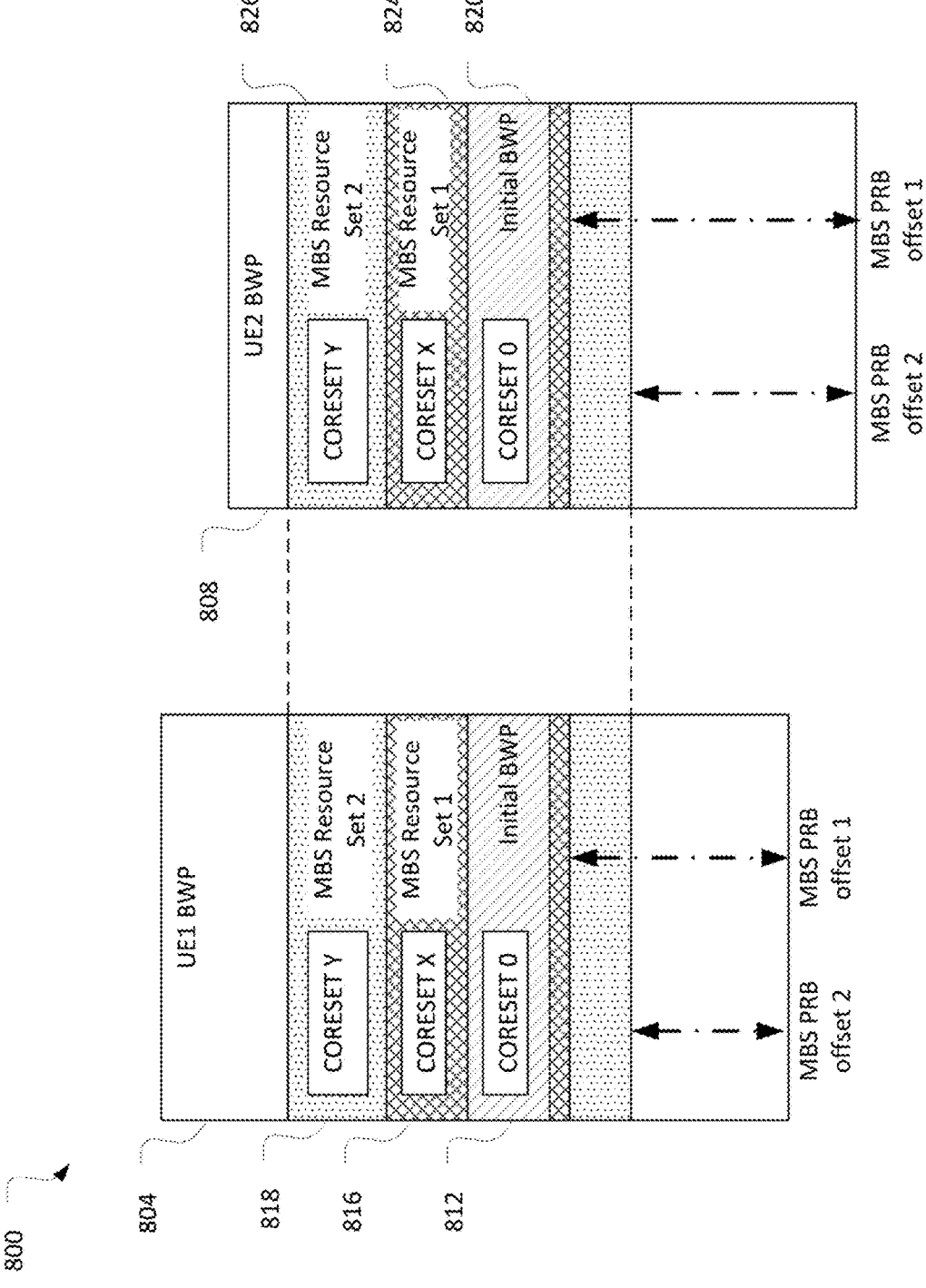
FIG. 8 illustrates another resource allocation in accordance with some aspects.

FIG. 8 illustrates configuration of the resource allocation 800 in accordance with some embodiments. The resource allocation 800 may include UE-dedicated BWPs such as, for example, UE1 BWP 804 and a UE2 BWP 808.

The UE1 BWP 804 may include an initial BWP 812 configured with CORESET 0; an MBS resource set 1 816 configured with CORESET X; and MBS resource set 2 818 configured with CORESET Y. Similarly, the UE2 BWP 808 may include an initial BWP 820 configured with CORESET 0; MBS resource set 1 824 configured with CORESET X; and MBS resource set 2 826 configured with CORESET Y.

The MBS resource sets 816, 818, 824, and 826 may be similar to MBS initial BWP, MBS BWP, MBS region 1, or MBS region 2 as described elsewhere herein.

The base station 108 may configure UEs with MBS resources of resource allocation 800 with reference to a starting point of the UE-dedicated BWPs. For example, the base station 108 may configure UE1 with MBS PRB offsets from UE1 BWP 804. The offsets may include MBS PRB offset 1 to provide an offset for MBS resource set 1 816 and MBS PRB offset 2 to provide an offset for MBS resource set 2 818. The base station 108 may also provide UE1 with an indication of the number of PRBs for the MBS resource set 1 816 and MBS resource set 2 818.

In a similar manner, the base station 108 may configure UE2 with MBS PRB offsets from UE2 BWP 808. The offsets may include: MBS PRB offset 1 to provide an offset for MBS resource set 1 824 and MBS PRB offset 2 to provide an offset for MBS resource set 2 826. The base station 108 may also provide UE2 with an indication of the number of PRBs for the MBS resource set 1 816 and MBS resource set 2 818.

The indications of the MBS PRB offsets and size of resource sets may be communicated using an RIV as discussed above with respect to FIG. 7.

Given that each UE is configured with different parameters, at least for the MBS PRB offsets, the configuration of resource allocation 800 may be accomplished using UE-specific configurations, for example, by RRC signaling.

Updates to 3GPP TSs may be desired to facilitate configuration and use of MBS resource sets as described herein.

For example, to allow MBS PDCCH to be received based on CORESET X to schedule MBS PDSCH in an MBS initial BWP, MBS BWP, MBS region 1, or MBS region 2, as described herein, section 7.3.1.2.1 of 3GPP TS 38.212 may be updated to include:

The following information is transmitted by means of the DCI format 1_0 with CRC scrambled by MBS-RNTI:

Identifier for DCI formats—1 bit

The value of this bit field is always set to 1, indicating a DL DCI format

Frequency domain resource assignment $$-\lceil \log_2(N_{RB}^{DL,BWP}(N_{RB}^{DL,BWP}+1)/2)\rceil$$

bits $$N_{RB}^{DL,BWP}$$

is the size of CORESET X configured for MBS

Time domain resource assignment—4 bits as defined in Clause 5.1.2.1 of [6, TS38.214 v16.4.0 (2021 Jan. 8)]

VRB-to-PRB mapping—1 bit according to Table 7.3.1.2.2-5

Modulation and coding scheme—5 bits as defined in Clause 5.1.3 of [6, TS38.214], using Table 5.1.3.1-1

New data indicator—1 bit

Redundancy version—2 bits as defined in Table 7.3.1.1.1-2

HARQ process number—4 bits

Downlink assignment index—2 bits, reserved

TPC command for scheduled PUCCH—2 bits as defined in Clause 7.2.1 of [5, TS38.213 v16.4.0 (2021 Jan. 8)]

PUCCH resource indicator—3 bits as defined in Clause 9.2.3 of [5, TS38.213]

PDSCH-to-HARQ feedback timing indicator—3 bits as defined in Clause 9.2.3 of [5, TS38.213].

In this manner, the information transmitted in an MBS PDCCH may be detected by using an MBS-RNTI, with a size of the frequency domain resource being determined based on a size of the CORESET X configured for MBS.

For another example, to allow MBS PDCCH to be received based on CORESET 0 to schedule MBS PDSCH in an MBS initial BWP, MBS BWP, MBS region 1, or MBS region 2, as described herein, section 7.3.1.2.1 of 3GPP TS 38.212 may be updated to include:

The following information is transmitted by means of the DCI format 1_0 with CRC scrambled by MBS-RNTI:

Identifier for DCI formats—1 bit

The value of this bit field is always set to 1, indicating a DL DCI format

Frequency domain resource assignment $$-\lceil \log_2(N_{RB}^{DL,BWP}(N_{RB}^{DL,BWP}+1)/2)\rceil$$

bits $$N_{RB}^{DL,BWP}$$

is the size of CORESET 0

Time domain resource assignment—4 bits as defined in Clause 5.1.2.1 of [6, TS38.214]

VRB-to-PRB mapping—1 bit according to Table 7.3.1.2.2-5

Modulation and coding scheme—5 bits as defined in Clause 5.1.3 of [6, TS38.214], using Table 5.1.3.1-1

New data indicator—1 bit

Redundancy version—2 bits as defined in Table 7.3.1.1.1-2

HARQ process number—4 bits

Downlink assignment index—2 bits, reserved

TPC command for scheduled PUCCH—2 bits as defined in Clause 7.2.1 of [5, TS38.213]

PUCCH resource indicator—3 bits as defined in Clause 9.2.3 of [5, TS38.213]

PDSCH-to-HARQ feedback timing indicator—3 bits as defined in Clause 9.2.3 of [5, TS38.213].

In this manner, the information transmitted in an MBS PDCCH may be detected by using an MBS-RNTI, with a size of the frequency domain resource being determined based on a size of the CORESET 0.

Unless as otherwise described, the definition of the terms of the above clauses to be added to 3GPP TS 38.212 may be consistent with the use of those terms elsewhere in 3GPP TS 38.212.

To allow the initial downlink to be utilized for MBS broadcast upon receipt of the related configuration information, rather than having to wait until the UE is in an RRC connected state, the definition of initialDownlinkBWP in section 6.3.2 of 3GPP TS 38.331 v16.3.1 (2012 January) may be updated to include the underlined sentence as follows.

initialDownlinkBWP

The initial downlink BWP configuration for a PCell. The network configures the locationAndBandwidth so that the initial downlink BWP contains the entire CORESET #0 of this serving cell in the frequency domain. The UE applies the locationAndBandwidth upon reception of this field (e.g. to determine the frequency position of signals described in relation to this locationAndBandwidth) but it keeps CORE-SET #0 until after reception of RRCSetup/RRCResume/RRCReestablishment. The UE applies the locationAndBandwidth upon reception of this field (for example, to determine the frequency position of signals described in relation to this locationAndBandwidth) if MBS is configured.

FIGS. 9-13 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

FIG. 9 illustrates an operation flow/algorithmic structure 400 in accordance with some aspects. The operation flow/algorithmic structure 900 may be performed or implemented by a UE such as, for example, UE 102, 104, 106, or 1400; or components thereof, for example, baseband processor 1404A.

The operation flow/algorithmic structure 900 may include, at 904, receiving MBS configuration information. The MBS configuration information may be received in a SIBz or in dedicated UE signaling such as, for example, RRC signaling.

The operation flow/algorithmic structure 900 may further include, at 908, determining whether an MBS BWP has been configured. The MBS BWP may be associated with the highest priority for receiving MBS multicast service. Thus, if an MBS BWP has been configured, the operation flow/algorithmic structure 900 may advance to applying the MBS BWP for MBS multicast service at 912.

If it is determined, at 908, that the MBS BWP is not configured, the operation flow/algorithmic structure 900 may advance to determining whether the MBS initial BWP is configured at 916. The MBS initial BWP may be associated with the second highest priority for receiving MBS multicast service. Thus, if an MBS initial BWP has been configured, the operation flow/algorithmic structure 900 may advance to applying the MBS initial BWP for MBS multicast service at 920. In this situation, the MBS initial BWP may be used to receive both MBS broadcast service and MBS multicast service.

If it is determined, at 916, that the MBS initial BWP is not configured, the operation flow/algorithmic structure 900 may advance to determining whether an initial BWP has been configured at 924. The initial BWP may be associated with the third highest priority for receiving MBS multicast service. Thus, if the initial BWP has been configured, the operation flow/algorithmic structure 900 may advance to applying the initial BWP for MBS multicast service.

If it is determined, at 924, that the initial BWP is not configured, the operation flow/algorithmic structure 900 may advance to applying CORESET 0 for MBS multicast service. The CORESET 0 may be associated with the fourth (or least) highest priority for receiving MBS multicast service.

There may be limited resources in both CORESET 0 and initial BWP to support MBS multicast services. Thus, in some situations, the CORESET 0 and initial BWP may be reserved for relatively limited multicast transmissions.

FIG. 10 illustrates an operation flow/algorithmic structure 1000 in accordance with some aspects. The operation flow/algorithmic structure 1000 may be performed or implemented by a UE such as, for example, UE 102, 104, 106, or 1400; or components thereof, for example, baseband processor 1404A.

The operation flow/algorithmic structure 1000 may include, at 1004, receiving MBS configuration information. The MBS configuration information may be received in a SIBz or in dedicated UE signaling such as, for example, RRC signaling. In situations in which MBS broadcast signaling is enabled before a UE is an RRC connected state, the configuration information may be transmitted by the SIBz, as the dedicated UE signaling may be unavailable in RRC inactive or idle states.

The operation flow/algorithmic structure 1000 may further include, at 1008, determining whether an MBS initial BWP has been configured. The MBS initial BWP may be associated with the highest priority for receiving MBS broadcast service. Thus, if an MBS initial BWP has been configured, the operation flow/algorithmic structure 1000 may advance to applying the MBS initial BWP for MBS broadcast service at 1012.

If it is determined, at 1008, that the MBS initial BWP is not configured, the operation flow/algorithmic structure 1000 may advance to determining whether the initial BWP is configured at 1016. The initial BWP may be associated with the second highest priority for receiving MBS broadcast service. Thus, if an initial BWP has been configured, the operation flow/algorithmic structure 1000 may advance to applying the initial BWP for MBS broadcast service at 1020.

If it is determined, at 1016, that the initial BWP is not configured, the operation flow/algorithmic structure 1000 may advance to applying CORESET 0 for MBS broadcast service at 1024.

Figure 11:
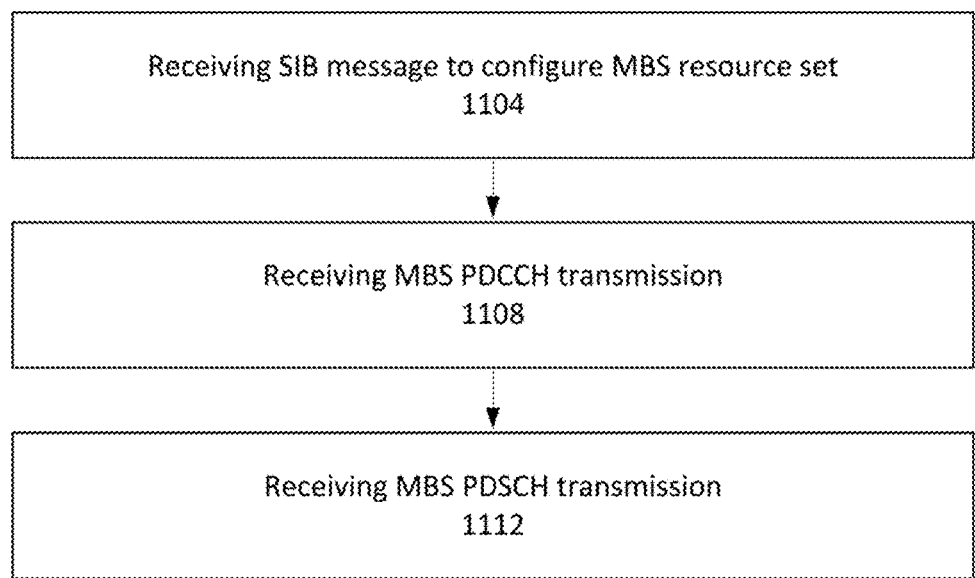
FIG. 11 illustrates another operational flow/algorithmic structure in accordance with some aspects.

FIG. 11 illustrates an operation flow/algorithmic structure 1100 in accordance with some aspects. The operation flow/algorithmic structure 1100 may be performed or implemented by a UE such as, for example, UE 102, 104, 106, or 1400; or components thereof, for example, baseband processor 1404A.

The operation flow/algorithmic structure 1100 may include, at 1104, receiving a SIB message to configure an MBS resource set. The MBS resource set may be an MBS initial BWP, an MBS region, an initial downlink BWP, or a CORESET 0.

The receipt of the SIB message at 1104 may be done by a UE in RRC idle, inactive, or connected states. The SIB message may be a SIBz message that is broadcast by a base station and is decodable by any UE within a coverage area of a cell provided by the base station.

The operation flow/algorithmic structure 1100 may further include, at 1108, receiving an MBS PDCCH transmission. The MBS PDCCH transmission may be within frequencies encompassed by the MBS resource set. For example, if an MBS initial BWP is configured, the MBS PDCCH transmission may be in a CORESET X (associated with the MBS initial BWP) or in another CORESET encompassed by, but not directly associated with, the MBS initial BWP. For example, the MBS PDCCH transmission may be in CORESET 0 associated with an initial BWP, which may be the case if CORESET X is not configured.

Receipt of the MBS PDCCH transmission may include decoding the transmission to recover information that schedules an MBS PDSCH transmission within the MBS resource set.

The operation flow/algorithmic structure 1100 may further include, at 1112, receiving the MBS PDSCH transmission in the MBS resource set. Receipt of the MBS PDSCH transmission may be based on the scheduling information in the MBS PDCCH transmission. Receipt of the MBS PDSCH transmission may include decoding the transmission to obtain MBS service data.

FIG. 12 illustrates an operation flow/algorithmic structure 1200 in accordance with some aspects. The operation flow/algorithmic structure 1200 may be performed or implemented by a UE such as, for example, UE 102, 104, 106, or 1400; or components thereof, for example, baseband processor 1404A.

The operation flow/algorithmic structure 1200 may include, at 1104, receiving configuration information while in an RRC connected state. The configuration information may configure one or more MBS resource sets such as, for example, MBS BWP, MBS initial BWP, MBS region(s), or initial BWP. Given that the receipt of the configuration information occurs while the UE is in an RRC connected state, the configuration information may be transmitted by either RRC signaling or by broadcast signaling, for example, SIBz. In the event that a resource set is configured for an MBS multicast service, the configuration information may be transmitted by UE-group specific signaling.

The operation flow/algorithmic structure 1200 may further include, at 1208, receiving an MBS PDCCH transmission that schedules an MBS PDSCH transmission. The operation flow/algorithmic structure 1200 may further include, at 1212, receiving an MBS PDSCH transmission. Receipt of the MBS PDCCH, at 1208, and MBS PDSCH, at

1212, may be similar to that described above with respect to blocks 1108 and 1112 of FIG. 11.

Figure 13:
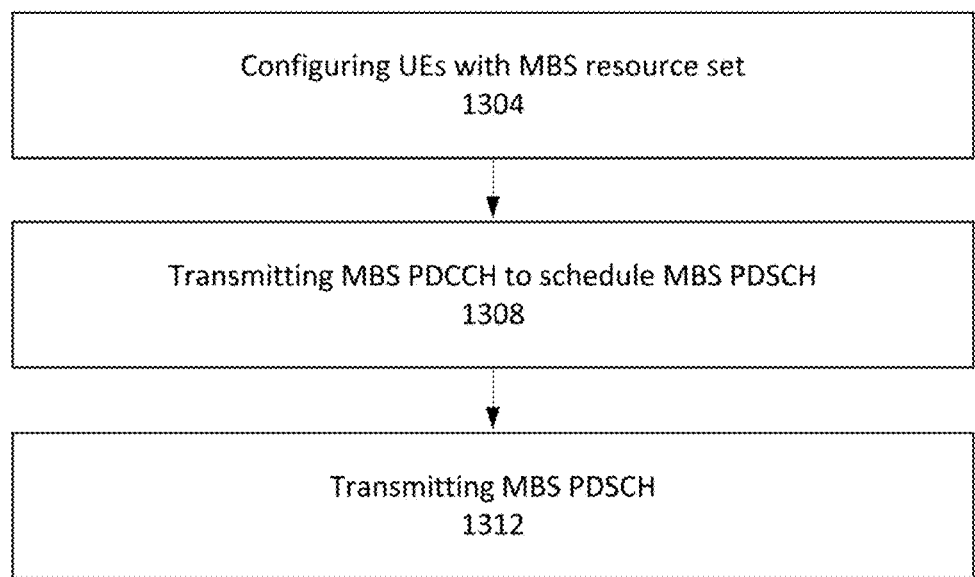
FIG. 13 illustrates another operational flow/algorithmic structure in accordance with some aspects.

FIG. 13 illustrates an operation flow/algorithmic structure 1300 in accordance with some aspects. The operation flow/algorithmic structure 1300 may be performed or implemented by a gNB such as, for example, base station 108 or gNB 1500; or components thereof, for example, baseband processor 1504A.

The operation flow/algorithmic structure 1300 may include, at 1304, configuring UEs with one or more MBS resource sets. The base station may configure the MBS resource sets as common frequency resources among one or more UEs. For example, The base station may configure all UEs of a cell with a resource set for MBS broadcast services; and may configure a subset of the UEs of a cell with a resource set for MBS multicast services. As described herein, the resource set for the MBS broadcast services may be configured to UEs in RRC idle, inactive, or connected states; while the resource set for the MBS multicast services may be configured to UEs in RRC connected state.

The configuration information may be transmitted by RRC signaling or SIB signaling.

The operation flow/algorithmic structure 1300 may further include, at 1308, transmitting MBS PDCCH to schedule an MBS PDSCH. The MBS PDCCH may be transmitted in a CORESET that is configured specifically for the MBS resource set, or a CORESET that is encompassed by, but not specifically configured for, the MBS resource set.

The operation flow/algorithmic structure 1300 may further include, at 1312, transmitting the MBS PDSCH. The MBS PDSCH may include broadcast service data or multicast service data as described herein.

Figure 14:
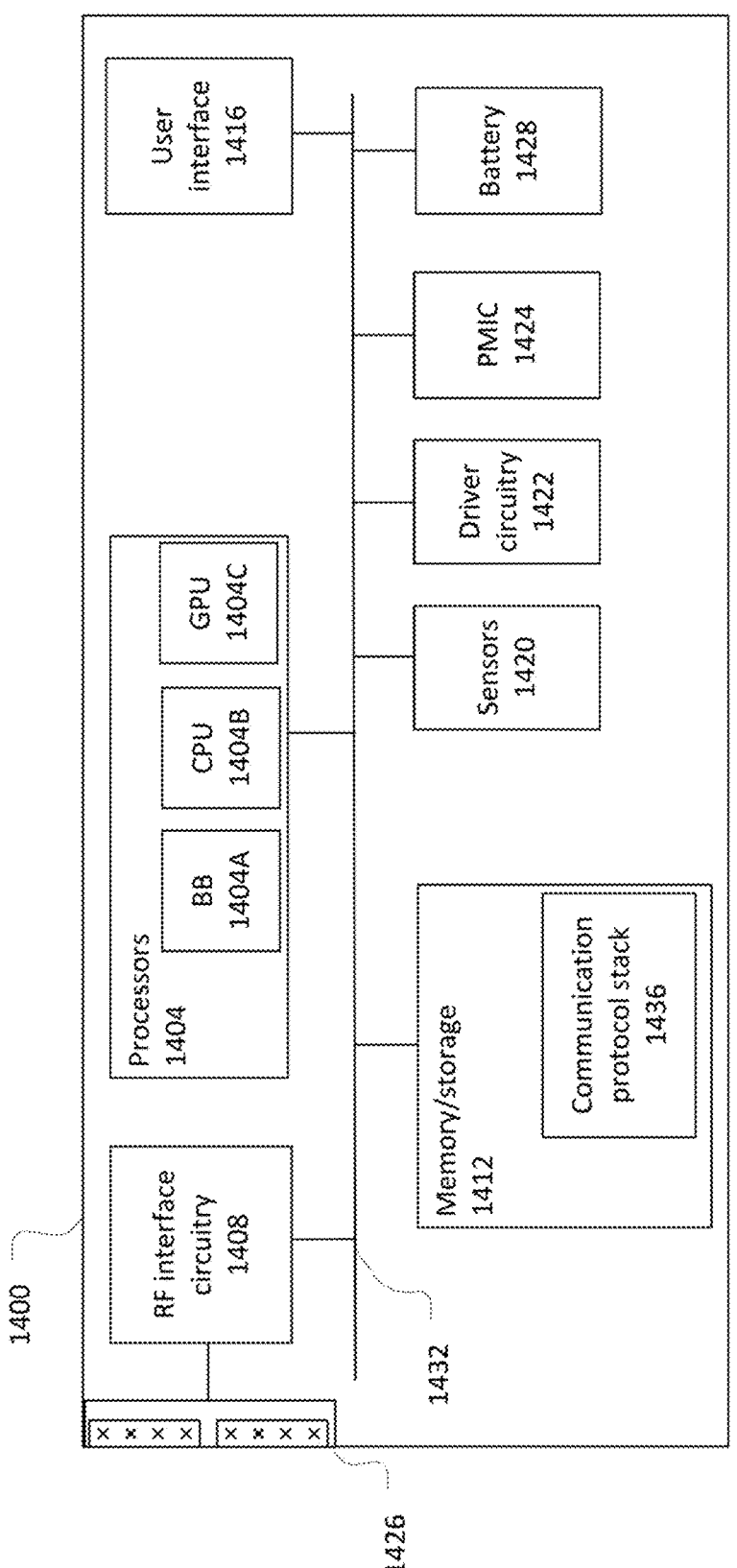
FIG. 14 illustrates a user equipment in accordance with some aspects.

FIG. 14 illustrates a UE 1400 in accordance with some aspects. The UE 1400 may be similar to and substantially interchangeable with UEs 102, 104, or 106.

The UE 1400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 1400 may include processors 1404, RF interface circuitry 1408, memory/storage 1412, user interface 1416, sensors 1420, driver circuitry 1422, power management integrated circuit (PMIC) 1424, antenna structure 1426, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangement of the components shown may occur in other implementations.

The components of the UE 1400 may be coupled with various other components over one or more interconnects 1432, which may represent any type of interface, input/output, bus (local, system, or expansion), transmission line, trace, optical connection, etc. that allows various circuit components (on common or different chips or chipsets) to interact with one another.

The processors 1404 may include processor circuitry such as, for example, baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some aspects, the baseband processor circuitry 1404A may access a communication protocol stack 1436 in the memory/storage 1412 to communicate over a 3GPP compatible network. In general, the baseband processor circuitry 1404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1408.

The baseband processor circuitry 1404A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 1412 may include one or more non-transitory, computer-readable media that includes instructions (for example, communication protocol stack 1436) that may be executed by one or more of the processors 1404 to cause the UE 1400 to perform various operations described herein. The memory/storage 1412 may also store configuration or MBS information as described elsewhere.

The memory/storage 1412 include any type of volatile or non-volatile memory that may be distributed throughout the UE 1400. In some aspects, some of the memory/storage 1412 may be located on the processors 1404 themselves (for example, L1 and L2 cache), while other memory/storage 1412 is external to the processors 1404 but accessible thereto via a memory interface. The memory/storage 1412 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1408 may include transceiver circuitry and radio frequency front module (RFEM) that allows the UE 1400 to communicate with other devices over a radio access network. The RF interface circuitry 1408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1426 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1426.

In various aspects, the RF interface circuitry 1408 may be configured to transmit/receive signals in a manner compatible with NR access technologies.

The antenna 1426 may include antenna elements to convert electrical signals into radio waves to travel through the air and to convert received radio waves into electrical signals. The antenna elements may be arranged into one or more antenna panels. The antenna 1426 may have antenna panels that are omnidirectional, directional, or a combination thereof to enable beamforming and multiple input, multiple output communications. The antenna 1426 may include microstrip antennas, printed antennas fabricated on the surface of one or more printed circuit boards, patch antennas, phased array antennas, etc. The antenna 1426 may have one or more panels designed for specific frequency bands including bands in frequency ranges 1 and 2.

The user interface circuitry 1416 includes various input/output (I/O) devices designed to enable user interaction with the UE 1400. The user interface 1416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1422 may include software and hardware elements that operate to control particular devices that are embedded in the UE 1400, attached to the UE 1100, or otherwise communicatively coupled with the UE 1400. The driver circuitry 1422 may include individual drivers allowing other components to interact with or control various input/output (I/O) devices that may be present within, or connected to, the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

A battery 1428 may power the UE 1400, although in some examples the UE 1400 may be mounted deployed in a fixed location, and may have a power supply coupled to an electrical grid. The battery 1428 may be a lithium ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
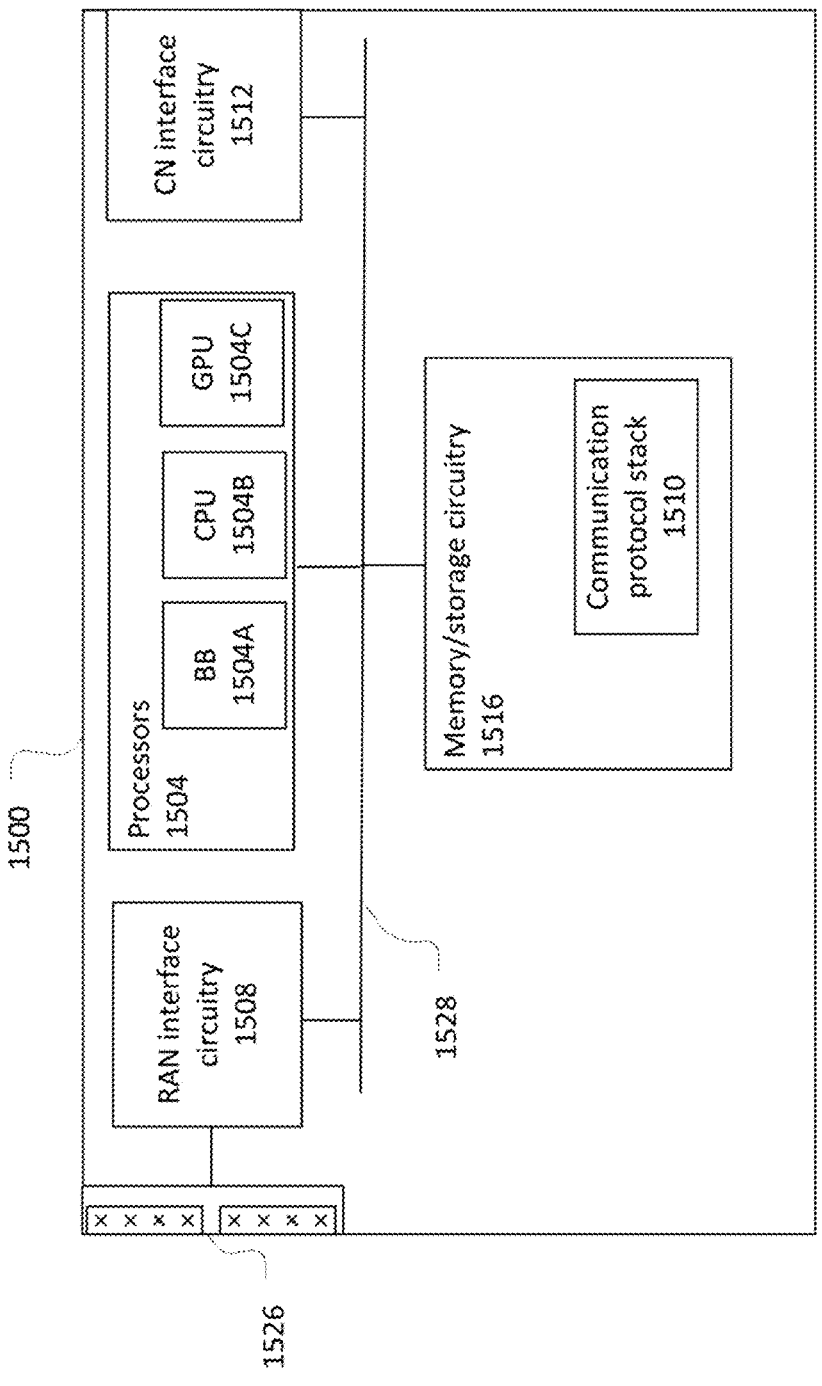
FIG. 15 illustrates a gNB in accordance with some aspects.

FIG. 15 illustrates a gNB 1500 in accordance with some aspects. The gNB node 1500 may similar to and substantially interchangeable with base station 108.

The gNB 1500 may include processors 1504, RF interface circuitry 1508, core network (CN) interface circuitry 1512, memory/storage circuitry 1516, and antenna structure 1526.

The components of the gNB 1500 may be coupled with various other components over one or more interconnects 1528.

The processors 1504, RF interface circuitry 1508, memory/storage circuitry 1516 (including communication protocol stack 1510), antenna structure 1526, and interconnects 1528 may be similar to like-named elements shown and described with respect to FIG. 13.

The CN interface circuitry 1512 may provide connectivity to a core network, for example, a 5$^{th}$ Generation Core network (5GC) using a 5GC-compatible network interface protocol such as carrier Ethernet protocols, or some other suitable protocol. Network connectivity may be provided to/from the gNB 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

In some aspects, the gNB 1500 may be coupled with transmit receive points (TRPs) using the antenna structure 1526, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a UE, the method comprising: receiving a system information block, SIB, message to configure a multicast or broadcast service, MBS, resource set, wherein the MBS resource set is: an MBS initial bandwidth part, BWP; an MBS frequency region; an initial downlink BWP; or a control resource set (CORESET) 0; receiving, within the MBS resource set, an MBS physical downlink control channel, PDCCH, transmission that schedules an MBS physical downlink shared channel, PDSCH, transmission; and receiving the PDSCH transmission to obtain MBS service data.

Example 2 includes a method of example 1 or some other example herein, further comprising receiving the MBS PDCCH and the MBS PDSCH while in a radio resource control, RRC, idle or inactive state and the MBS service data is for a broadcast service.

Example 3 includes method of example 1 or some other example herein, wherein the MBS resource set comprises the MBS initial BWP, the MBS service data is for a broadcast service, and the MBS initial BWP contains CORESET 0 in a frequency domain.

Example 4 includes a method of example 3 or some other example herein, further comprising: receiving configuration information to configure a CORESET X, wherein X is a number other than zero; and receiving the MBS PDCCH transmission based on the CORESET X.

Example 5 includes the method of example 3 or some other example herein, further comprising: receiving the MBS PDCCH transmission based on the CORESET 0.

Example 6 includes the method of example 1 or some other example herein, wherein the MBS resource set is configured for a plurality of services multiplexed in a frequency domain or a time domain, the plurality of services to include one or more MBS multicast services and unicast physical downlink shared channel, PDSCH.

Example 7 includes the method of example 1 or some other example herein, wherein: the MBS resource set is the initial downlink BWP; the initial downlink BWP includes CORESET 0 in a frequency domain; and the UE is to receive, while in a radio resource control, RRC, inactive or idle state, the MBS PDCCH transmission based on the CORESET 0 and the MBS PDSCH within the initial downlink BWP.

Example 8 includes a method of example 1 or some other example herein, wherein the MBS resource set comprises the MBS frequency region within a UE-dedicated BWP.

Example 9 includes the method of example 1 or some other example herein, further comprising: receiving, in cell-specific or UE-group specific signaling, an indication of a physical resource block, PRB, offset and a number of PRBs of the MBS resource set; and identifying the MBS resource set based on the PRB offset and the number of PRBs.

Example 10 includes the method of example 9 or some other example herein, wherein the PRB offset is with reference to a configured point A or to a starting point of a UE-dedicated BWP.

Example 11 includes a method of operating a user equipment, UE, the method comprising: receiving, while in a radio resource control, RRC, connected state, configuration information to configure a multicast or broadcast service, MBS, resource set within a UE-specific bandwidth part, BWP; receiving, within the MBS resource set, an MBS physical downlink control channel, PDCCH, transmission that schedules an MBS physical downlink shared channel, PDSCH transmission that includes multicast service data; and receiving, within the MBS resource set, the MBS PDSCH transmission.

Example 12 includes the method of example 11 or some other example herein, wherein the MBS resource set comprises an MBS BWP, the configuration information is to configure a first control resource set, CORESET, for the MBS BWP, and the method further comprises: receiving the MBS PDCCH transmission in: the first CORESET; a second CORESET configured for an MBS initial BWP; or a CORESET 0 configured for an initial BWP.

Example 13 includes the method of example 11 or some other example herein, wherein the MBS resource set comprises an MBS BWP, an MBS initial BWP, or an initial BWP.

Example 14 includes the method of example 11 or some other example herein, further comprising: receiving the configuration information by RRC signaling.

Example 15 includes the method of example 11 or some other example herein, wherein the MBS resource set comprises an MBS frequency region within a UE-dedicated BWP.

Example 16 includes the method of example 11 or some other example herein, further comprising: receiving, in cell-specific or UE-group specific signaling, an indication of a physical resource block, PRB, offset and a number of PRBs of the MBS resource set; and identifying the MBS resource set based on the PRB offset and the number of PRBs.

Example 17 includes the method of example 16 or some other example herein, wherein the PRB offset is with reference to a configured point A or to a starting point of a UE-dedicated BWP.

Example 18 includes a method of operating a UE, the method comprising: storing configuration information for one or more multicast or broadcast service, MBS, resource sets, and priority information corresponding to the one or more MBS resource sets; identifying, from the one or more MBS resource sets, an MBS resource set having a relatively highest priority of the one or more MBS resource sets; and applying the MBS resource set for an MBS service.

Example 19 includes the method of example 18 or some other example herein, wherein the one or more MBS resource sets includes an MBS bandwidth part, BWP, having a first priority; an MBS initial bandwidth part having a second priority that is less than the first priority; an initial BWP having a third priority that is less than the second priority; or a control resource set, CORESET, 0 having a fourth priority that is less than the third priority.

Example 20 includes the method of example 18 or some other example herein, wherein the one or more MBS resource sets includes a first MBS frequency region having a first priority; a second MBS frequency region having a second priority that is less than the first priority; an initial BWP having a third priority that is less than the second priority; or a control resource set, CORESET, 0 having a fourth priority that is less than the third priority.

Example 21 includes the method of any one of examples 18-20, wherein the MBS service is an MBS broadcast service or an MBS multicast service.

Example 22 includes a method of operating a base station, the method comprising: configuring one or more user equipments, UEs, with a multicast or broadcast service, MBS, resource set, wherein the MBS resource set is common for the one or more UEs, is configured within respective UE-dedicated bandwidth parts, BWPs, and is configured as: an MBS BWP; an MBS frequency region; an initial downlink BWP; or a control resource set (CORESET) 0; transmitting, to the one or more UEs, an MBS physical downlink control channel, PDCCH, transmission to schedule an MBS physical downlink shared channel, PDSCH, transmission within the MBS resource set; and transmitting, to the one or more UEs, MBS service data in the MBS PDSCH transmission.

Example 23 includes a method of example 22 or some other example herein, wherein the MBS resource set comprises the MBS initial BWP, the MBS service data is for a broadcast service, and the MBS initial BWP encompasses the initial downlink BWP and CORESET 0 in a frequency domain.

Example 24 includes a method of example 23 or some other example herein, further comprising: transmitting the MBS PDCCH based on CORESET 0 or CORESET X, where X is a number other than zero.

Example 25 includes the method of any one of examples 22-24, wherein configuring the one or more UEs comprises: transmitting configuration information in a system information block message or in radio resource control signaling.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving first configuration information that configures a multicast or broadcast service (MBS) initial bandwidth part (BWP) and a first control resource set (CORE-SET), wherein the MBS initial BWP has a first bandwidth that is larger than a second bandwidth of an initial downlink BWP, and the second bandwidth is encompassed by the first bandwidth;
prior to receiving second configuration information, monitoring the first CORESET for a first MBS physical downlink control channel (PDCCH) transmission that schedules a first MBS physical downlink shared channel (PDSCH) transmission in the MBS initial BWP;
receiving the second configuration information that configures an MBS BWP and a second CORESET, wherein the MBS BWP includes a third bandwidth that is larger than the first bandwidth, and the first bandwidth is encompassed by the third bandwidth; and
after receiving the second configuration information, monitoring the second CORESET for a second MBS PDCCH transmission that schedules a second MBS PDSCH transmission in the MBS BWP.

2. The method of claim 1, further comprising:
prior to receiving the first configuration information, monitoring a CORESET 0 in the initial downlink BWP for a third MBS PDCCH transmission that schedules a third MBS PDSCH transmission in the initial downlink BWP.

3. The method of claim 1, further comprising:
receiving the first and second configuration information by radio resource control (RRC) signaling.

4. The method of claim 1, further comprising:
receiving an MBS radio network temporary identifier (RNTI) associated with an MBS service, wherein monitoring the first or second CORESET includes decoding a PDCCH transmission using the MBS RNTI.

5. The method of claim 1, wherein the MBS initial BWP is configured with respect to configured point A that corresponds to a center of subcarrier 0 belonging to common resource block 0.

6. The method of claim 5, further comprising:
receiving a system information block; and
determining the configured point A based on the system information block.

7. A method comprising:
generating, for transmission to a user equipment (UE), first configuration information to configure the UE with a multicast or broadcast service (MBS) initial bandwidth part (BWP) and a first control resource set (CORESET), wherein MBS initial BWP has a first bandwidth that is larger than a second bandwidth of an initial downlink BWP, and the second bandwidth is encompassed by the first bandwidth;
generating, for transmission to the UE, second configuration information that configures an MBS BWP and a second CORESET, wherein the second configuration information is received after the first configuration information, the MBS BWP includes a third bandwidth that is larger than the first bandwidth, and the first bandwidth is encompassed by the third bandwidth;
generating, for transmission to the UE, an MBS physical downlink control channel (PDCCH) transmission to schedule an MBS physical downlink shared channel (PDSCH) transmission, wherein the MBS PDCCH transmission is within the first CORSET and the MBS PDSCH transmission is within the MBS initial BWP or the MBS PDCCH transmission is within the second CORESET and the MBS PDSCH transmission is within the MBS BWP; and
generating, for transmission to the UE, the MBS PDSCH transmission with MBS service data as scheduled by the MBS PDCCH transmission.

8. The method of claim 7, wherein the MBS PDCCH transmission is a first MBS PDCCH transmission, the MBS PDSCH transmission is a first MBS PDSCH transmission and the method further comprises;

generating, for transmission to the UE, a second MBS PDCCH transmission within a CORESET 0 to schedule a second MBS PDSCH transmission within the initial downlink BWP; and generating, for transmission to the UE, the second MBS PDSCH transmission.

9. The method of claim 7, further comprising:

generating radio resource control (RRC) signaling to include the first and second configuration information.

10. The method of claim 8, further comprising:

encoding the first MBS PDCCH transmission or the second MBS PDCCH transmission using an MBS radio network temporary identifier (RNTI) associated with an MBS service.

11. One or more non-transitory, computer-readable media having instructions that, when executed, cause processing circuitry to:

process first configuration information that configures a multicast or broadcast service (MBS) initial bandwidth part (BWP) and a first control resource set (CORE-SET), wherein MBS initial BWP has a first bandwidth that is larger than a second bandwidth of an initial downlink BWP and the second bandwidth is encompassed by the first bandwidth;

prior to receipt of second configuration information, monitor the first CORESET for a first MBS physical downlink control channel (PDCCH) transmission to schedule a first MBS physical downlink shared channel (PDSCH) transmissions in the MBS initial BWP;

process the second configuration information that configures an MBS BWP and a second CORESET, wherein the MBS BWP includes a third bandwidth that is larger than the first bandwidth, and the first bandwidth is encompassed by the third bandwidth; and after receipt of the second configuration information, monitor the second CORESET for a second MBS PDCCH transmission that schedules a second MBS PDSCH transmission in the MBS BWP.

12. The one or more non-transitory, computer-readable media of claim 11, wherein the instructions, when executed, further cause the processing circuitry to:

prior to receipt of the first configuration information, monitor a CORESET 0 in the initial downlink BWP for a third MBS PDCCH transmission that schedules a third MBS PDSCH transmission in the initial downlink BWP.

13. The one or more non-transitory, computer-readable media of claim 11, wherein the instructions, when executed, further cause the processing circuitry to:

receive an MBS radio network temporary identifier (RNTI) associated with an MBS service, wherein to monitor the first or second CORESET the processing circuitry is to decode a PDCCH transmission using the MBS RNTI.

\* \* \* \* \*